US011238236B2

(12) United States Patent
Wang et al.

(10) Patent No.: US 11,238,236 B2
(45) Date of Patent: Feb. 1, 2022

(54) SUMMARIZATION OF GROUP CHAT THREADS

(71) Applicant: INTERNATIONAL BUSINESS MACHINES CORPORATION, Armonk, NY (US)

(72) Inventors: Dakuo Wang, Cambridge, MA (US); Ming Tan, Malden, MA (US); Chuang Gan, Cambridge, MA (US); Haoyu Wang, Somerville, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 16/595,550

(22) Filed: Oct. 8, 2019

(65) Prior Publication Data
US 2021/0103636 A1 Apr. 8, 2021

(51) Int. Cl.
*G06F 40/30* (2020.01)
*H04L 29/06* (2006.01)
*G06N 3/08* (2006.01)
*G06N 3/04* (2006.01)
*H04L 12/58* (2006.01)

(52) U.S. Cl.
CPC ........... *G06F 40/30* (2020.01); *G06N 3/0445* (2013.01); *G06N 3/08* (2013.01); *H04L 51/16* (2013.01); *H04L 65/403* (2013.01)

(58) Field of Classification Search
CPC ........ G06F 40/258; G06F 40/30; G06F 40/35; G06N 3/0445; G06N 3/08; H04L 51/04; H04L 51/16; H04L 63/30; H04L 65/403

USPC .............................................................. 709/9
See application file for complete search history.

(56) References Cited

U.S. PATENT DOCUMENTS

| | | | | |
|---|---|---|---|---|
| 6,346,952 | B1 * | 2/2002 | Shtivelman | H04M 3/5191 |
| | | | | 715/758 |
| 7,359,936 | B2 * | 4/2008 | Gruen | G06Q 10/107 |
| | | | | 709/203 |
| 9,116,984 | B2 * | 8/2015 | Caldwell | G06F 16/345 |
| 9,219,704 | B2 * | 12/2015 | Hamlin | G06N 5/025 |
| 9,800,529 | B2 * | 10/2017 | Malik | H04L 51/08 |
| 9,929,994 | B2 * | 3/2018 | Hamlin | H04L 51/08 |
| 10,417,340 | B2 * | 9/2019 | Applegate | G06F 16/345 |
| 10,785,185 | B2 * | 9/2020 | Vennam | H04L 51/22 |

(Continued)

OTHER PUBLICATIONS

D. Nguyen et al., "Thread Reconstruction in Conversational Data using Neural Coherence Models." (Submitted on Jul. 24, 2017 (v1), last revised Jul. 25, 2017 (this version, v2)), online at the [internet: URL:https://arxiv.org/abs/1707.07660], 5 pages.

(Continued)

*Primary Examiner* — Khai N. Nguyen
(74) *Attorney, Agent, or Firm* — F. Chau & Associates, LLC

(57) ABSTRACT

Systems and methods provide for automated messaging summarization and ranking. The systems and methods may use an integrated machine learning model to perform thread detection, thread summarization, and summarization ranking. The messages may be received from a team chat application, organized, summarized and ranked by the machine learning model, and the results may be returned to the team chat application. In some cases, the ranking may be different for different users of the team chat application.

17 Claims, 10 Drawing Sheets

(56) References Cited

U.S. PATENT DOCUMENTS

| | | | | |
|---|---|---|---|---|
| 10,810,243 | B2* | 10/2020 | Karn | G06N 3/0445 |
| 2003/0163537 | A1* | 8/2003 | Rohall | G06Q 10/107 |
| | | | | 709/206 |
| 2003/0167310 | A1* | 9/2003 | Moody | G06Q 10/107 |
| | | | | 709/206 |
| 2003/0177190 | A1* | 9/2003 | Moody | H04L 51/00 |
| | | | | 709/206 |
| 2008/0162889 | A1* | 7/2008 | Cascaval | G06F 9/3851 |
| | | | | 712/216 |
| 2008/0281927 | A1* | 11/2008 | Vanderwende | G06Q 10/107 |
| | | | | 709/206 |
| 2012/0143972 | A1* | 6/2012 | Malik | H04L 51/36 |
| | | | | 709/206 |
| 2013/0006973 | A1* | 1/2013 | Caldwell | G06F 16/345 |
| | | | | 707/723 |
| 2016/0080304 | A1* | 3/2016 | Hamlin | G06N 20/00 |
| | | | | 709/206 |
| 2017/0155607 | A1* | 6/2017 | Chakra | G06F 40/30 |
| 2019/0121852 | A1* | 4/2019 | Applegate | G06F 40/284 |
| 2019/0386949 | A1* | 12/2019 | Vennam | G06Q 10/109 |
| 2020/0285663 | A1* | 9/2020 | Karn | G06N 3/0445 |
| 2021/0034706 | A1* | 2/2021 | Misra | G06F 40/30 |
| 2021/0103636 | A1* | 4/2021 | Wang | G06N 3/0445 |

OTHER PUBLICATIONS

J. Ulrich, "Supervised Machine Learning for Email Thread Summarization," A thesis submitted in partial fulfillment of the requirements for the degree of Master of Science in The Faculty of Graduate Studies (Computer Science). The University of British Columbia. Published Sep. 2008, 70 pages.

D. Uthus and D. Aha, "Plans toward automated chat summarization." In Proceedings of the Workshop on Automatic Summarization for Different Genres, Media, and Languages (WASDGML '11). Association for Computational Linguistics, pp. 1-7, 2011.

G. Murray and G. Carenini. "Summarizing spoken and written conversations." In Proceedings of the Conference on Empirical Methods In Natural Language Processing (EMNLP '08). Association tor Computational Linguistics, pp. 773-782, 2008.

A. Sood, "Towards Summarization of Written Text Conversations," Thesis submitted in partial fulfillment of the requirements for the degree of Master of Science (by Research) in Computer Science and Engineering, Search and Information Extraction Lab, International Institute of Information Technology, Hyderabad—500 032, India, Jun. 2013. 82 pages.

O. Rambow et al., "Summarizing email threads," In Proceedings of HLT-NAACL 2004: Short Papers (HLTJ-NAACL-Short '04). Association for Computational Linguistics, pp. 105-108, 2004.

S. Tarnpradab et al., "Toward Extractive Summarization of Online Forum Discussions via Hierarchical Attention Networks," AAAI Publications, The Thirtieth international Flairs Conference, 2017. pp. 288-292, [internet: URL:https://www.aaai.org/ocs/index.php/FLAIRS/FLAIRS17/paper/viewPaper/15500].

* cited by examiner

SUMMARIZATION OF GROUP CHAT THREADS

BACKGROUND

The following relates generally to communication technology, and more specifically to personalized summarization of group chat threads.

A group chat is a digital conference room where information is shared via text or instant message to multiple people at the same time. Users in a group chat connected to each other via an internet connection, or the like. When a user receives a chat update, a user's device may provide an alert regarding the new text.

The popularity of the group chat has led to the possibility that user may be simultaneously connected in multiple different chats with many other users. The amount of information that a user digests in each chat can be substantial, with a multitude of group chats available to a user.

Since group chat conversations may move quickly, the likelihood of a user missing important information is high. This missed information leads to problems such as scheduling conflicts, missed opportunities, or updates with other users. Therefore, a system is needed to automatically digest group chat information for a user and summarize the information for quick and easy comprehension.

SUMMARY

A method, apparatus, non-transitory computer readable medium, and system for personalized summarization of group chat threads are described. Embodiments of the method, apparatus, non-transitory computer readable medium, and system may categorize a set of messages into a plurality of message threads, generate a thread summary for each of the plurality of message threads, order the thread summaries, and transmit the ordered thread summaries to one or more users.

DETAILED DESCRIPTION

Systems and methods provide for automated message summarization using a machine learning model. The machine learning model may include several integrated sub-models for performing thread detection, thread summarization, summarization ranking. The systems may receive messages from a team chat application, organized, summarized and ranked by the machine learning model, and the results may be returned to the team chat application. In some cases, the ranking may be different for different users of the team chat application.

A chat channel may include messages from multiple users, and may include a number of informal conversation threads. Users often separate these different conversations mentally, but when the number of conversations grows large, this task may become difficult and important information may be missed.

Thus, according to embodiments of the present disclosure, messages are input into a thread detection model. The thread detection model assigns each message a thread ID. New messages are compared to existing messages, and either grouped with an existing conversational thread (represented by a unique thread ID) or used to create a new conversation.

Once the messages are grouped into threads, the threads are then output to a summarization model. The summarization model creates a human-readable summarization for each thread. The summaries are then output to a ranking model. The ranking model creates a ranked list of the summaries. The ranked lists of summaries are then output to a user interface for a chat application. Users may then read the ranked summarizations of the messages in the chat.

Training three separate models (i.e., thread detection, summarization, and ranking) may require different training data for each model. In some cases obtaining this training data for each model may be difficult or costly. Therefore, the present disclosure describes an integrated system in which all three sub-models may be trained together. Thus, the system may be trained using a single set of training data.

Figure 1:
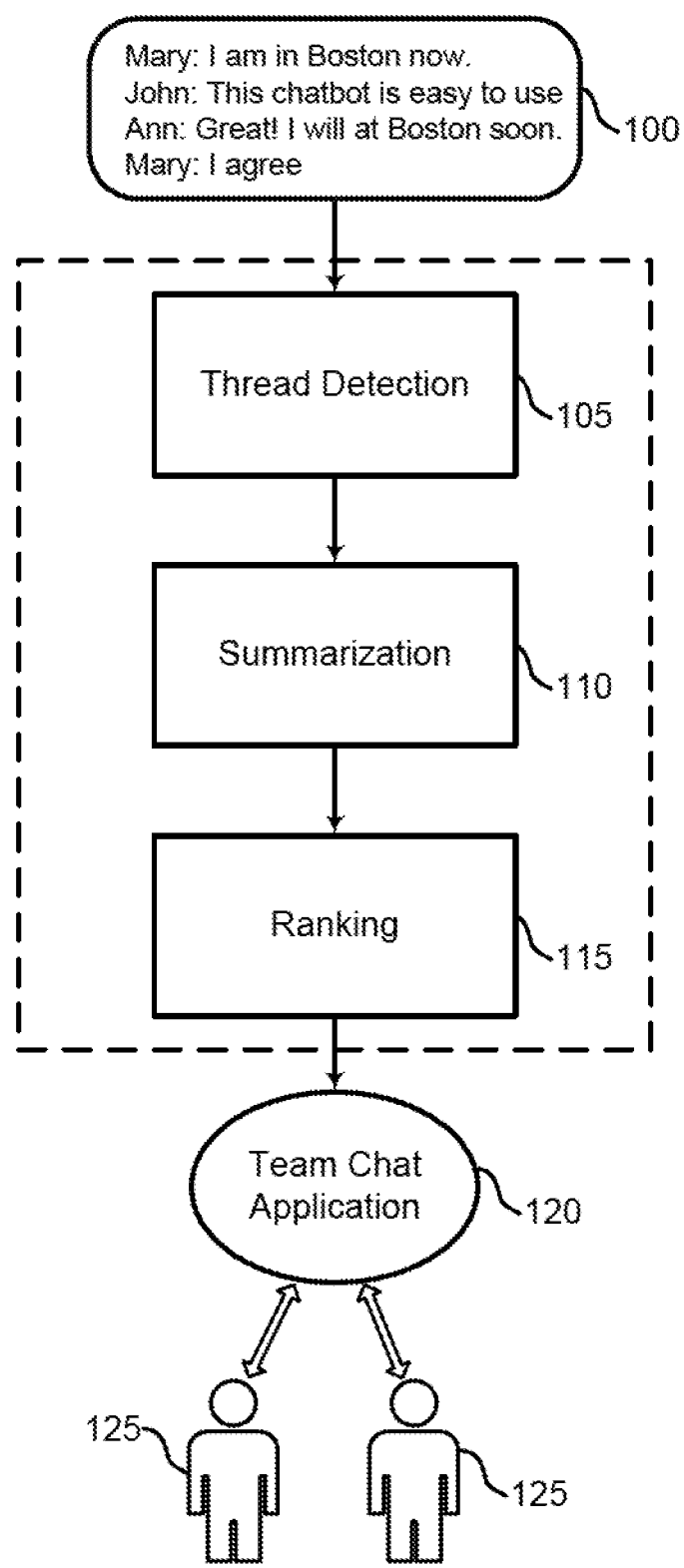
FIG. 1 shows an example of a process for conversation thread detection according to aspects of the present disclosure.

FIG. 1 shows an example of a process for conversation thread detection 105 according to aspects of the present disclosure. The example shown includes conversation channel 100, thread detection 105, summarization 110, ranking 115, team chat application 120, and users 125.

Conversation channel 100 may represent message from a team chat application 120 (either text or audio), and may include multiple conversations being carried out by a variety of different people. Once the messages from the conversation channel 100 are received, thread detection 105 may be performed. Thread detection 105 may be performed on conversational data using a neural coherence model for automatically identifying the underlying thread structure of a forum discussion.

Once the threads are identified, summarization 110 may be performed to create a single, human-readable summary of the conversation thread. Lastly, ranking 115 organizes the summaries in order of importance to the users 125. The ranked summaries may be transmitted to users 125 via team chat application 120.

Team chat application 120 may be an example of, or include aspects of, the corresponding element or elements described with reference to FIG. 9. Thread detection 105, summarization 110, ranking 115 can be implemented as an artificial neural network (ANN) as described below with reference to FIG. 10.

Thus, messages are input to a thread detection model where they are assigned to threads. The threads are output to the summarization model. The summarization model then uses an encoder to embed the threads in a vector space. Then the summarization model outputs the embedded threads to a decoder where thread summarization occurs. Each summary is then packaged into ranked summarizations in a ranking model.

Manually generated ranked summarizations may be input to a learning module to train an integrated network including the thread detection model, the summarization model, and the ranking model.

Figure 2:
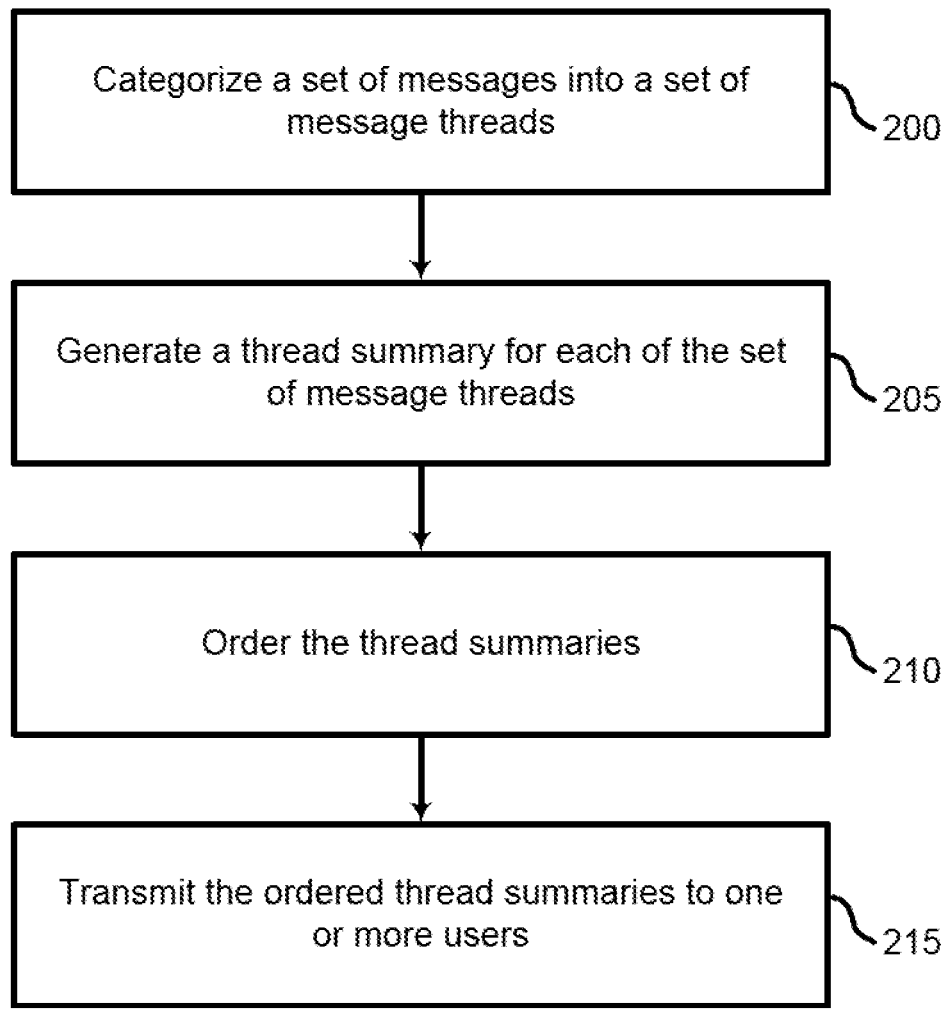
FIG. 2 shows an example of a process for summarization of group chat threads according to aspects of the present disclosure.

FIG. 2 shows an example of a process for summarization of group chat threads according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 200, the system categorizes a set of messages into a set of message threads. In some cases, the operations of this step may refer to, or be performed by, a thread detection component as described with reference to FIG. 10. An embodiment of operation 200 is described in further detail with reference to FIG. 3 and FIG. 4.

At operation 205, the system generates a thread summary for each of the set of message threads. In some cases, the operations of this step may refer to, or be performed by, a summarization component as described with reference to FIG. 10. An embodiment of operation 205 is described in further detail with reference to FIG. 5 and FIG. 6.

At operation. 210, the system orders the thread summaries, in some cases, the operations of this step may refer to, or be performed by, a ranking component as described with reference to FIG. 10. An embodiment of operation 210 is described in further detail with reference to FIG. 7 and FIG. 8.

At operation 215, the system transmits the ordered thread summaries to one or more users. In some cases, the operations of this step may refer to, or be performed by, a communication component as described with reference to FIG. 10. An embodiment of operation 215 is described in further detail with reference to FIG. 7 and FIG. 8.

Figure 3:
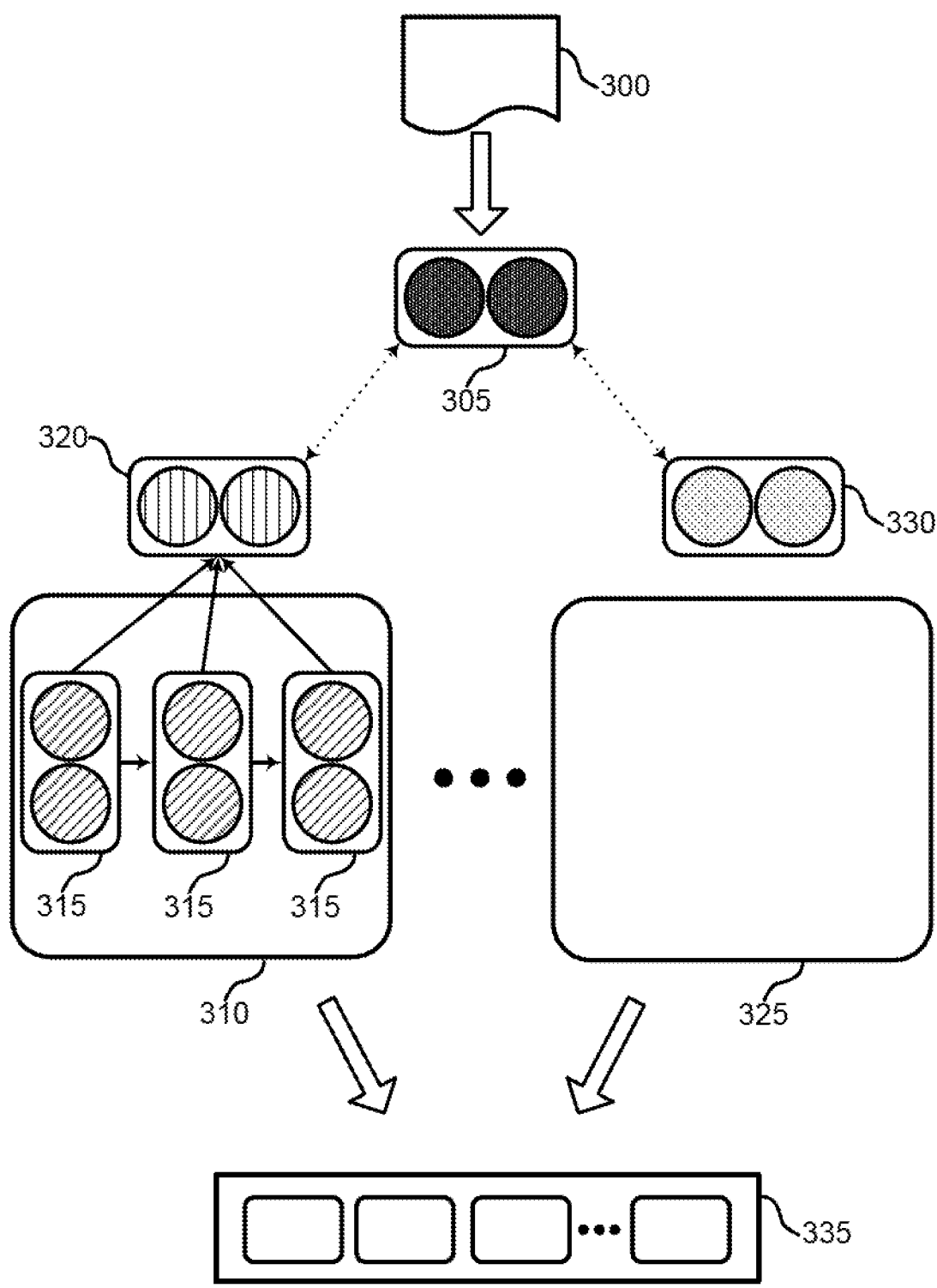
FIG. 3 shows an example of a thread detection model according to aspects of the present disclosure.

FIG. 3 shows an example of a thread detection model according to aspects of the present disclosure. The example shown includes new message 300, feature vector 305, existing threads 310, candidate vectors 320, new thread 325, default candidate vector 330, and a combined set of conversation threads 335. Existing thread 310 may include existing messages 315.

When a new message is received, it may be converted into a feature vector 305 including features such as word count, verb use, author, time. In some cases each vector may have a large number of dimensions (e.g., 500 or more). In some examples, the conversion may be performed using a single directional LSTM encoder, or any other suitable text encoder.

Once the feature vector 305 is generated, it may be compared to candidate vectors 320 representing existing threads 310, as well as a default candidate vector 330 representing a new thread 325 (i.e., a "dummy" thread that does not yet have any messages associated with it). For example, the comparison may include determining the Euclidian distance between the vectors. Based on the comparison, an existing thread 310 will be selected (or the new thread 325) and the new message 300 will be associated with that thread (e.g., by assigning a thread ID). If the new thread 325 is selected, the new thread 325 may be replaced by a subsequent new thread so that there is always the possibility of creating a new thread.

Once a set of messages has been categorized, a set of conversation threads 335 may be created that includes all of the threads that were created during the categorization process.

Figure 4:
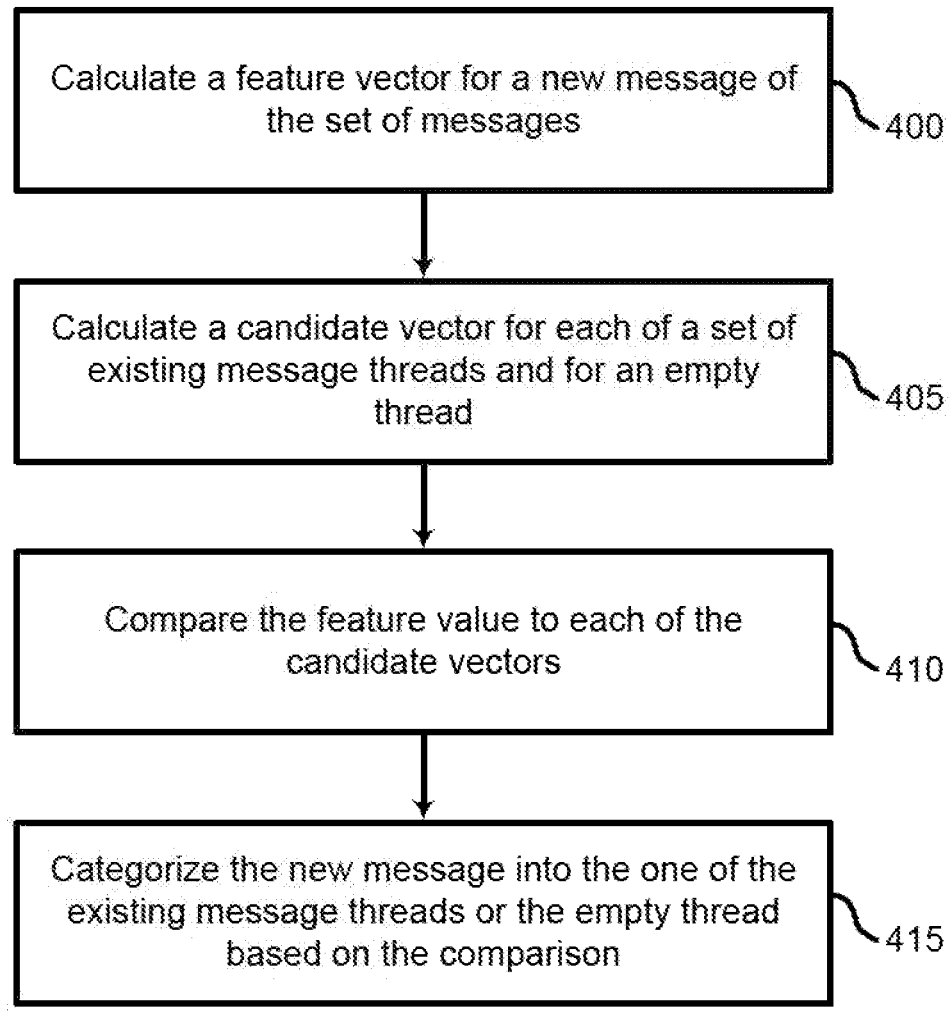
FIG. 4 shows an example of a process for categorizing a set of messages into a plurality of message threads according to aspects of the present disclosure.

FIG. 4 shows an example of a process for categorizing a set of messages into a plurality of message threads according to aspects of the present disclosure, in some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 400, the system calculates a feature vector for a new message of the set of messages. In some cases, the operations of this step may refer to, or be performed by, a thread detection component as described with reference to FIG. 10.

At operation 405, the system calculates a candidate vector for each of a set of existing message threads and for an empty thread, in some cases, the operations of this step may refer to, or be performed by, a thread detection component as described with reference to FIG. 10.

At operation 410, the system compares the feature value to each of the candidate vectors. In some cases, the operations of this step may refer to, or be performed by, a thread detection component as described with reference to FIG. 10.

At operation 415, the system categorizes the new message into the one of the existing message threads or the empty thread based on the comparison. In some cases, the operations of this step may refer to, or be performed by, a thread detection component as described with reference to FIG. 10.

Figure 5:
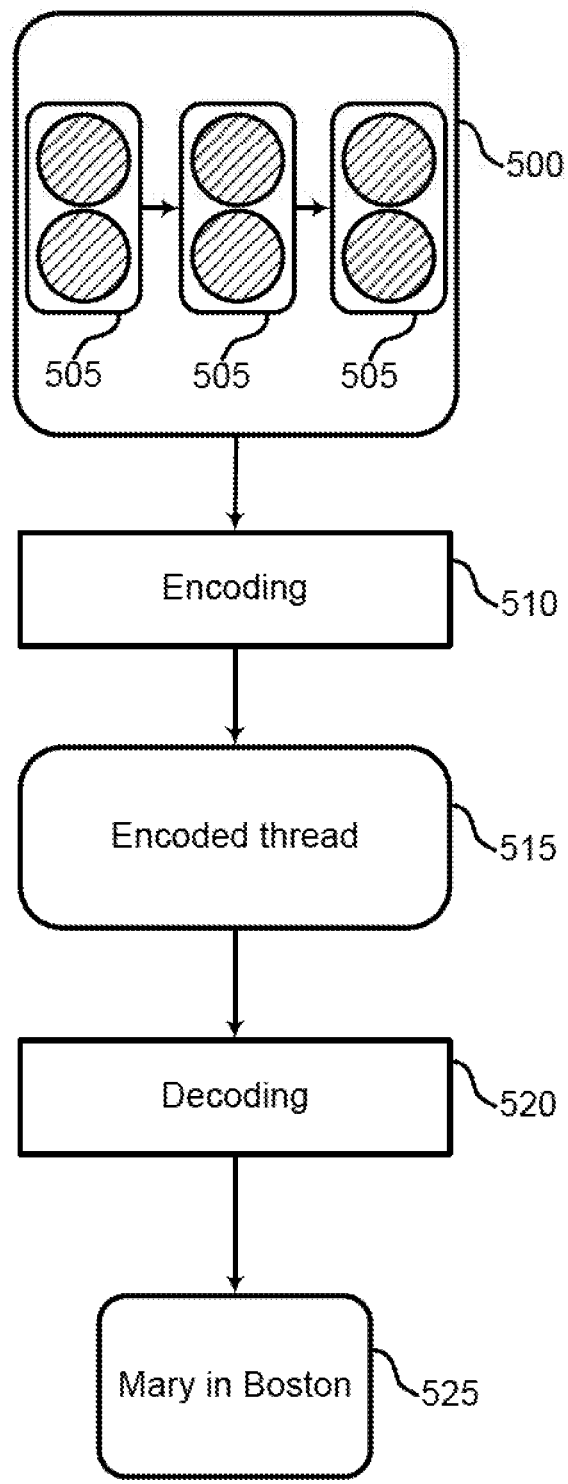
FIG. 5 shows an example of a summarization model according to aspects of the present disclosure.

FIG. 5 shows an example of a summarization model according to aspects of the present disclosure. The example shown includes thread 500, encoding 510, encoded thread 515, decoding 520, and summary 525. The thread 500 may include a plurality of messages 505.

After a set of messages have been categorized, the resulting threads may be processed by the summarization model. The summarization model encodes a thread 500 (at encoding 510) to produce encoded thread 515. Then a decoding model (at decoding 520) processes the encoded thread to produce a summary 525. In various embodiments, the threads may be encoded and decoded using an LSTM model, a GRU model, a Transformer model, or any suitable other model or algorithm.

Figure 6:
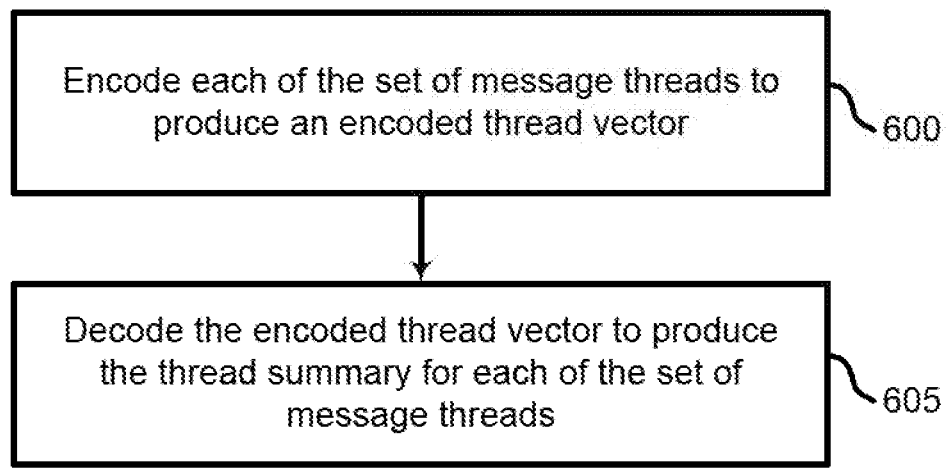
FIG. 6 shows an example of a process for generating a thread summary for each of a plurality of message threads according to aspects of the present disclosure.

FIG. 6 shows an example of a process for generating a thread summary for each of a plurality of message threads according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 600, the system encodes each of the set of message threads to produce an encoded thread vector. In some cases, the operations of this step may refer to, or be performed by, a summarization component as described with reference to FIG. 10.

At operation 605, the system decodes the encoded thread vector to produce the thread summary for each of the set of message threads. In some cases, the operations of this step may refer to, or be performed by, a summarization component as described with reference to FIG. 10.

Figure 7:
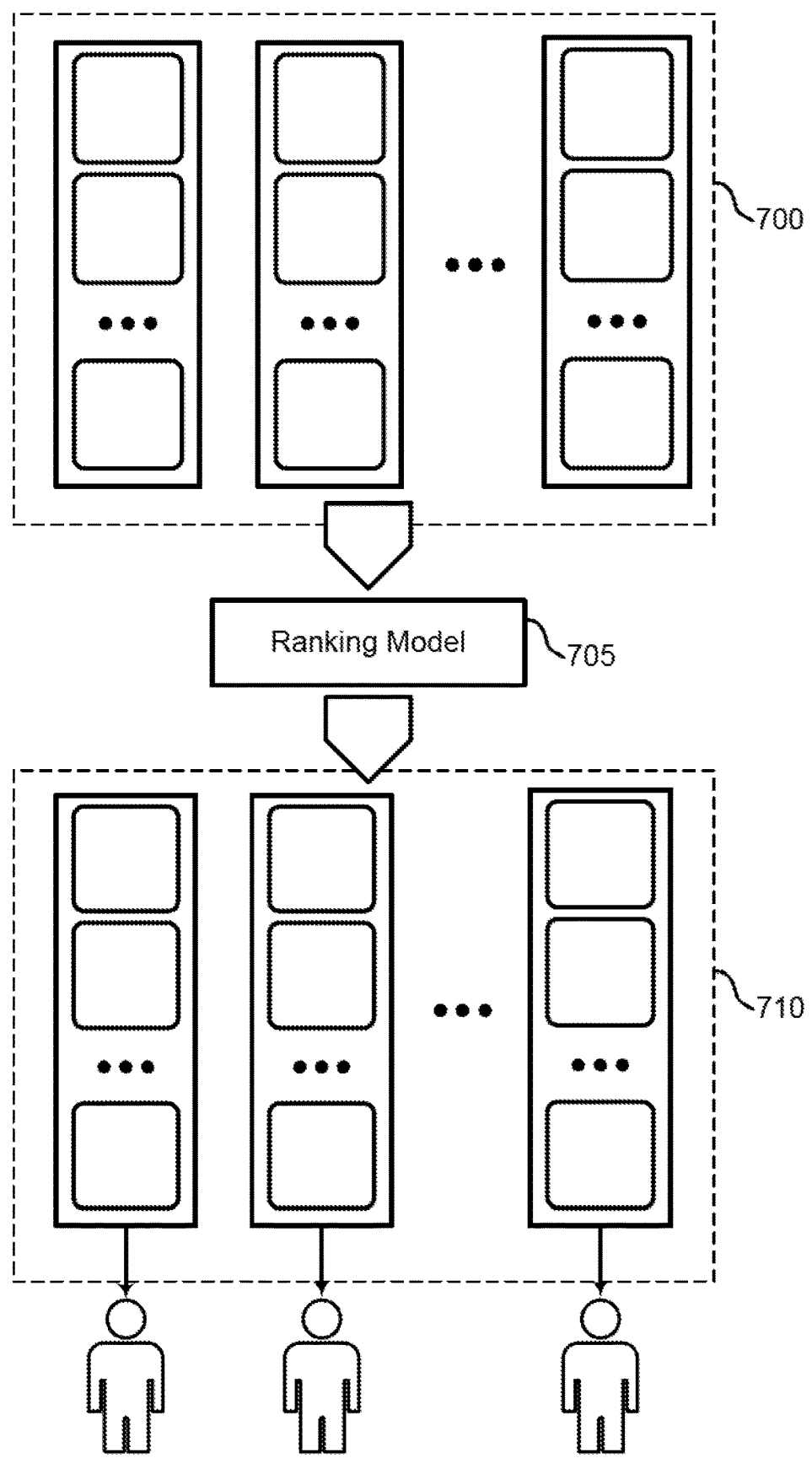
FIG. 7 shows an example of a ranking model according to aspects of the present disclosure.

FIG. 7 shows an example of a ranking model according to aspects of the present disclosure. The example shown includes candidate orderings 700, ranking model 705, and selected orderings 710.

The ranking model may generate a plurality of candidate orderings 700. For example, the candidate orderings 700 may correspond to each possible ordering of the threads identified by the thread detection model. The ranking model 705 takes one or more candidate orderings 700 as input and outputs a ranking value for each of the candidate orderings 700. In some cases, meta-data, such as information about a user is also used to order the candidate orderings 700.

A selected ordering 710 is the output of the ranking model 705. For example, the candidate ordering 700 that results in the highest output value may be selected as the selected ordering 710. In some cases, a different selected ordering 710 is provided for each user. Thus, each selected ordering 710 may include the summaries created by the summarization model in an order that is most likely to present relevant information to a particular user. In some cases, the selected ordering 710 is then passed to a team chat application to be shown to the various users.

A predictive ranking for the ranked summarizations is output. For each user, the ranking equation may be represented as:

$$\log P(R|M) = \log \Sigma P(R,S|M) = \log \Sigma \Sigma P(R\ S,T|M), \quad (1)$$

where P is the probability, R represents the "correct" ordering, M represents an index of a candidate ordering 700, S represents the thread summary, and T represents a thread.

Figure 8:
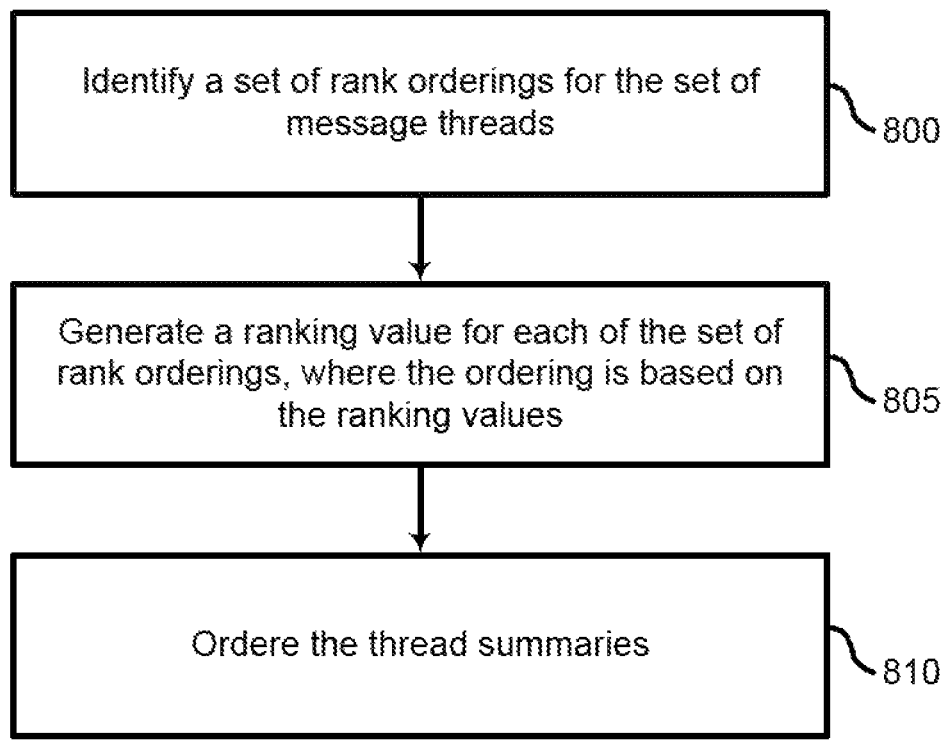
FIG. 8 shows an example of a process for ordering thread summaries according to aspects of the present disclosure.

FIG. 8 shows an example of a process for ordering thread summaries according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 800, the system identifies a set of rank orderings for the set of message threads. In some cases, the operations of this step may refer to, or be performed by, a ranking component as described with reference to FIG. 10.

At operation 805, the system generates a ranking value for each of the set of rank orderings, where the ordering is based on the ranking values. In some cases, the operations of this step may refer to, or be performed by, a ranking component as described with reference to FIG. 10.

At operation 810, the system orders the thread summaries. In some cases, the operations of this step may refer to, or be performed by, a ranking component as described with reference to FIG. 10.

Figure 9:
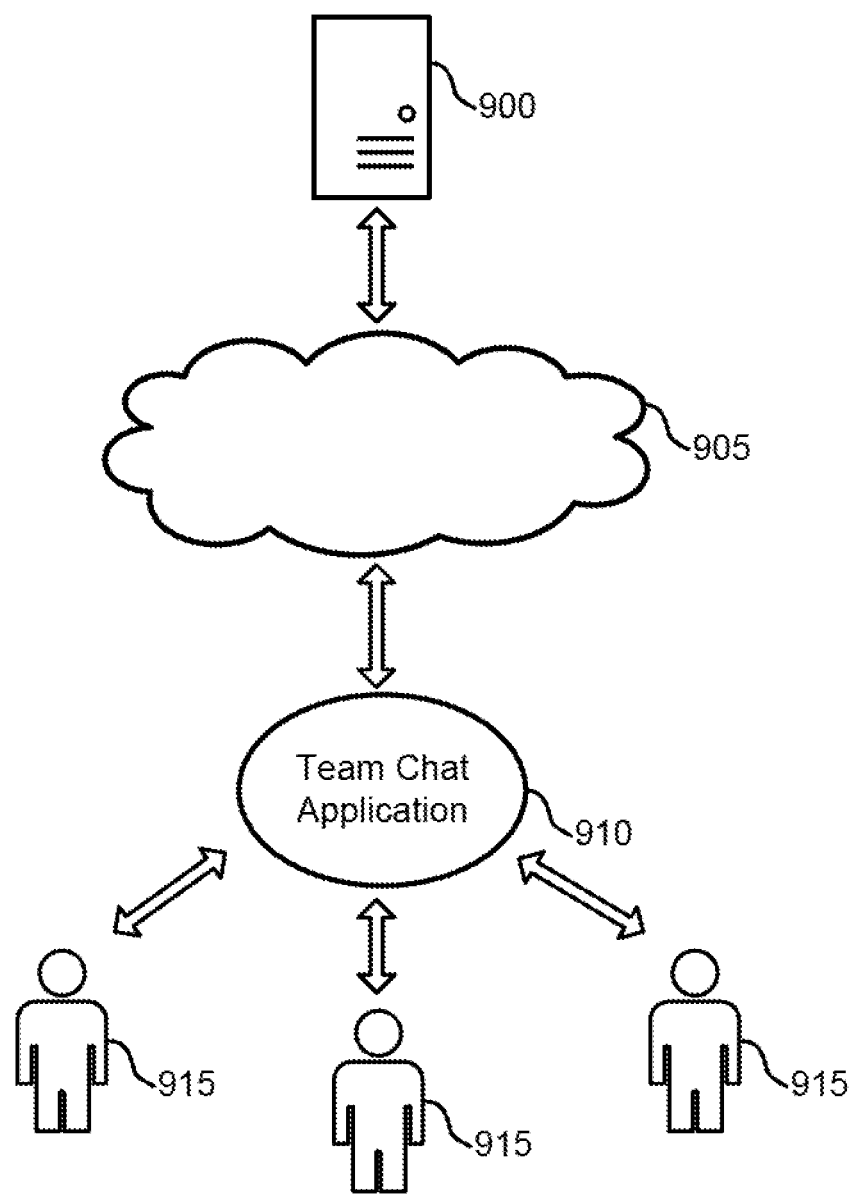
FIG. 9 shows an example of a group chat summarization system according to aspects of the present disclosure.

FIG. 9 shows an example of a group chat summarization system according to aspects of the present disclosure. The example shown includes server 900, network 905, team chat application 910, and users 915. The users 915 may communicate with each other via the team chat application 910, and the team chat application 910 may then transmit message to server 900 via network 905.

Once the server 900 has received the messages, it may categorize them into different threads, generate a summary for each thread, and rank the threads. Then the server 900 may transmit the ranked threads (including the summaries) back to the team chat application 910. In some cases, different users 915 may be presented with different rankings or summarizations.

Server 900 may be an example of, or include aspects of, the corresponding element or elements described with reference to FIG. 10. Team chat application 910 may be an example of, or include aspects of, the corresponding element or elements described with reference to FIG. 1.

Figure 10:
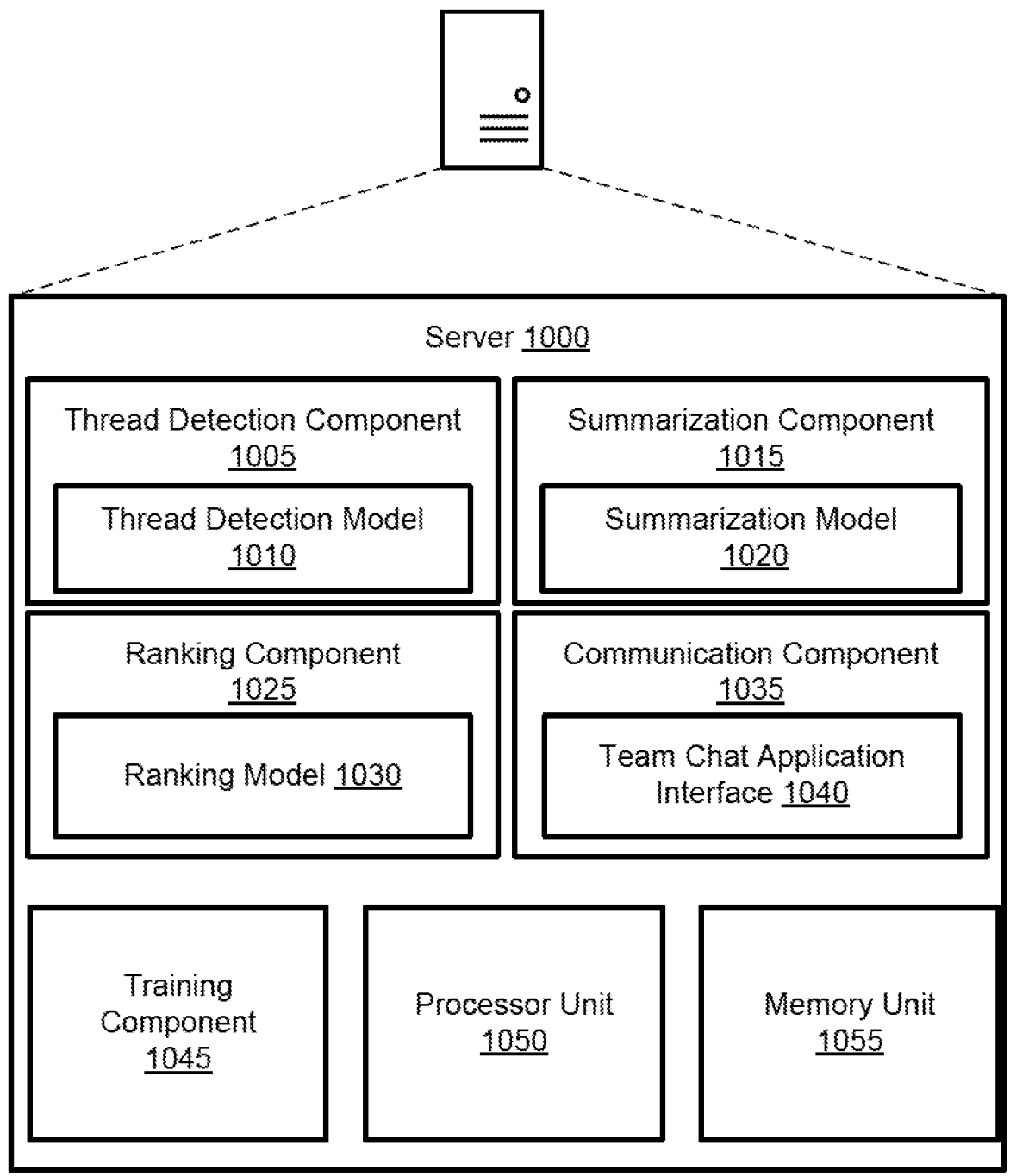
FIG. 10 shows an example of a server according to aspects of the present disclosure.

FIG. 10 shows an example of a server 1000 according to aspects of the present disclosure. Server 1000 may include thread detection component 1005, summarization component 1015, ranking component 1025, communication component 1035, training component 1045 processor unit 1050, and memory unit 1055.

A server 1000 may provide one or more functions to requesting users linked by way of one or more of the various networks. In some cases, the server 1000 may include a single microprocessor board, which may include a microprocessor responsible for controlling all aspects of the server 1000, in some cases, a server 1000 may use a microprocessor and protocols to exchange data with other devices/users on one or more of the networks via hypertext transfer protocol (HTTP) and simple mail transfer protocol (SMTP), although other protocols may be also used, such as file transfer protocol (FTP), and simple network management protocol (SNMP). A server 1000 may be a general-purpose computing device, a personal computer, a laptop computer, a mainframe computer, a super computer, or any other suitable processing apparatus. Server 1000 may be an example of, or include aspects of, the corresponding element or elements described with reference to FIG. 9.

Thread detection component 1005 may categorize a set of messages into a set of message threads. Thread detection component 1005 may first calculate a feature vector for a new message of the set of messages. In some examples, the feature vector includes word count information, vocabulary information, message author information, message time information, or any combination thereof. Thread detection component 1005 may then calculate a candidate vector for each of a set of existing message threads and for an empty thread and compare the feature value to each of the candidate vectors.

Thread detection component 1005 may categorize the new message into the one of the existing message threads or the empty thread based on the comparison, in some cases, thread detection component 1005 may determine that a match value is closest to a candidate value for an existing thread or an empty thread, and the new message may be categorized into the corresponding thread based on the determination. Thread detection component 1005 may also generate a new empty thread if a new message is categorized to the empty (new) thread.

Thread detection component 1005 may include thread detection model 1010. In some examples, the thread detection model 1010 is based on a single direction long short-term memory (LSTM) model.

Summarization component 1015 may generate a thread summary for each of the set of message threads. Summarization component 1015 may also encode each of the set of message threads to produce an encoded thread vector. Summarization component 1015 may also decode the encoded thread vector to produce the thread summary for each of the set of message threads.

Summarization component 1015 may include summarization model 1020. In some examples, the summarization model 1020 is based on an LSTM model, a gated recurrent unit (GRU) model, a transformer model, or any combination thereof.

Ranking component 1025 may order the thread summaries. Ranking component 1025 may also identify a set of rank orderings for the set of message threads. Ranking component 1025 may also generate a ranking value for each of the set of rank orderings, where the ordering is based on the ranking values. Ranking component 1025 may also identify user information for each of the one or more users. Ranking component 1025 may also select a set of rank orderings from the set of rank orderings based on the user information, where one of the set of rank orderings is selected for each of the one or more users. Ranking component 1025 may include ranking model 1030.

Communication component 1035 may transmit the ordered thread summaries to one or more users. Communication component 1035 may also receive the set of messages from the team chat application, where the ordered thread summaries are transmitted to the one or more users via the team chat application. Communication component 1035 may include team chat application interface 1040.

Training component 1045 may train an integrated machine learning model using a set of training messages and a target set of ranked summaries, where categorizing the set of messages, generating the thread summaries, and ordering the thread summaries are all performed using the integrated machine learning model.

A processor unit 1050 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof), in some cases, the processor may be configured to operate a memory array using a memory controller. In other cases, a memory controller may be integrated into the processor. The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip.

A memory unit 1055 may store information for various programs and applications on a computing device. For example, the storage may include data for running an operating system. The memory may include both volatile memory and non-volatile memory. Volatile memory may be random access memory (RAM), and non-volatile memory may include read-only memory (ROM), flash memory, electrically erasable programmable read-only memory (EEPROM), digital tape, a hard disk drive (HDD), and a solid-state drive (SSD). The memory may include any combination of readable and/or writable volatile memories and/or non-volatile memories, along with other possible storage devices.

In some examples, the thread detection component 1005, summarization component 1015, and ranking component 1025 may be implemented using an artificial neural network (ANN). An ANN is a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training, process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

Accordingly, the present disclosure includes the following embodiments.

A method for personalized summarization of group chat threads is described. Embodiments of the method may categorize a set of messages into a plurality of message threads, generating a thread summary for each of the plurality of message threads, ordering the thread summaries, and transmitting the ordered thread summaries to one or more users.

An apparatus for the summarization of group chat threads is described. The apparatus may include a processor, memory in electronic communication with the processor, and instructions stored in the memory. The instructions may be operable to cause the processor to categorize a set of messages into a plurality of message threads, generate a thread summary for each of the plurality of message threads, order the thread summaries, and transmit the ordered thread summaries to one or more users.

A non-transitory computer readable medium storing code for summarization of group chat threads is described. In some examples, the code comprises instructions executable by a processor to: categorize a set of messages into a plurality of message threads, generate a thread summary for each of the plurality of message threads, order the thread summaries, and transmit the ordered thread summaries to one or more users.

A system for personalized summarization of group chat threads is described. Embodiments of the system may provide for categorizing a set of messages into a plurality of message threads, means for generating a thread summary for each of the plurality of message threads, means for ordering the thread summaries, and means for transmitting the ordered thread summaries to one or more users.

Some examples of the method, apparatus, non-transitory computer readable medium, and system described above may further include calculating a feature vector for a new message of the set of messages. Some examples may further include calculating a candidate vector for each of a set of existing message threads and for an empty thread. Some examples may further include comparing the feature value to each of the candidate vectors. Some examples may further include categorizing the new message into the one of the existing message threads or the empty thread based on the comparison.

Some examples of the method, apparatus, non-transitory computer readable medium, and system described above may further include determining that the match value is closest to the candidate value for the empty thread, wherein the new message is categorized into the empty thread based on the determination. Some examples may further include generating a new empty thread based on the determination.

In some examples, the candidate vectors are calculated based on a single direction long short-term memory (LSTM) model. In some examples, the feature vector includes word count information, vocabulary information, message author information, message time information, or any combination thereof.

Some examples of the method, apparatus, non-transitory computer readable medium, and system described above may further include encoding each of the plurality of message threads to produce an encoded thread vector. Some examples may further include decoding the encoded thread vector to produce the thread summary for each of the plurality of message threads. In some examples, the encoding and decoding are based on an LSTM model, a gated recurrent unit (GRU) model, a transformer model, or any combination thereof.

Some examples of the method, apparatus, non-transitory computer readable medium, and system described above may further include identifying a set of rank orderings for the plurality of message threads. Some examples may further include generating a ranking value for each of the set of rank orderings, wherein the ordering is based on the ranking values.

Some examples of the method, apparatus, non-transitory computer readable medium, and system described above may further include identifying user information for each of the one or more users. Some examples may further include selecting a plurality of rank orderings from the set of rank orderings based on the user information, wherein one of the plurality of rank orderings is selected for each of the one or more users.

Some examples of the method, apparatus, non-transitory computer readable medium, and system described above may further include receiving the set of messages from a team chat application, wherein the ordered thread summaries are transmitted to the one or more users via the team chat application.

Some examples of the method, apparatus, non-transitory computer readable medium, and system described above may further include training an integrated machine learning model using a set of training messages and a target set of ranked summaries, wherein categorizing the set of messages, generating the thread summaries, and ordering the thread summaries are all performed using the integrated machine learning model.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed as computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for communication technology, comprising:
   categorizing a set of messages into a plurality of message threads;
   generating a thread summary for each of the plurality of message threads;
   ordering the thread summaries; and
   transmitting the ordered thread summaries to one or more users
   wherein the categorization comprises:
      calculating a feature vector for a new message of the set of messages;

calculating a candidate vector for each of a set of existing message threads and for an empty thread;

comparing the feature value to each of the candidate vectors; and categorizing the new message into the one of the existing message threads or the empty thread based on the comparison.

2. The method of claim 1, further comprising:

determining that the match value is closest to the candidate value for the empty thread, wherein the new message is categorized into the empty thread based on the determination; and generating a new empty thread based on the determination.

3. The method of claim 1, wherein:

the candidate vectors are calculated based on a single direction long short-term memory (LSTM) model.

4. The method of claim 1, wherein:

the feature vector includes word count information, vocabulary information, message author information, message time information, or any combination thereof.

5. The method of claim 1, further comprising:

encoding each of the plurality of message threads to produce an encoded thread vector; and decoding the encoded thread vector to produce the thread summary for each of the plurality of message threads.

6. The method of claim 5, wherein:

the encoding and decoding are based on an LSTM model, a gated recurrent unit (GRU) model, a transformer model, or any combination thereof.

7. The method of claim 1, further comprising:

identifying a set of rank orderings for the plurality of message threads; and generating a ranking value for each of the set of rank orderings, wherein the ordering is based on the ranking values.

8. The method of claim 7, further comprising:

identifying user information for each of the one or more users; and selecting a plurality of rank orderings from the set of rank orderings based on the user information, wherein one of the plurality of rank orderings is selected for each of the one or more users.

9. The method of claim 1, further comprising:

receiving the set of messages from a team chat application, wherein the ordered thread summaries are transmitted to the one or more users via the team chat application.

10. The method of claim 1, further comprising:

training an integrated machine learning model using a set of training messages and a target set of ranked summaries, wherein categorizing the set of messages, generating the thread summaries, and ordering the thread summaries are all performed using the integrated machine learning model.

11. An apparatus for summarization of group chat threads, comprising: a processor and a memory storing instructions and in electronic communication with the processor, the processor being configured to execute the instructions to:

receive a set of messages from a team chat application;

categorize the set of messages into a plurality of message threads;

generate a thread summary for each of the plurality of message threads;

order the thread summaries; and transmit the ordered thread summaries to one or more users via the team chat application wherein the categorization comprises:

calculating a feature vector for a new message of the set of messages;

calculating a candidate vector for each of a set of existing message threads and for an empty thread;

comparing the feature value to each of the candidate vectors; and categorizing the new message into the one of the existing message threads or the empty thread based on the comparison.

12. The apparatus of claim 11, the processor being further configured to execute the instructions to:

encode each of the plurality of message threads to produce an encoded thread vector; and decode the encoded thread vector to produce the thread summary for each of the plurality of message threads.

13. The apparatus of claim 11, the processor being further configured to execute the instructions to:

identify a set of rank orderings for the plurality of message threads; and generate a ranking value for each of the set of rank orderings, wherein the ordering is based on the ranking values.

14. The apparatus of claim 13, the processor being further configured to execute the instructions to:

identify user information for each of the one or more users; and select a plurality of rank orderings from the set of rank orderings based on the user information, wherein one of the plurality of rank orderings is selected for each of the one or more users.

15. A non-transitory computer readable medium storing code for summarization of group chat threads, the code comprising instructions executable by a processor to:

train an integrated machine learning model using a set of training messages and a target set of ranked summaries;

categorize a set of messages into a plurality of message threads using the integrated machine learning model;

generate a thread summary for each of the plurality of message threads using the integrated machine learning model;

order the thread summaries using the integrated machine learning model; and transmit the ordered thread summaries to one or more users wherein the categorization comprises:

calculating a feature vector for a new message of the set of messages;

calculating a candidate vector for each of a set of existing message threads and for an empty thread;

comparing the feature value to each of the candidate vectors; and categorizing the new message into the one of the existing message threads or the empty thread based on the comparison.

16. The non-transitory computer readable medium of claim 15, the code further comprising instructions executable by the processor to:

encode each of the plurality of message threads to produce an encoded thread vector; and decode the encoded thread vector to produce the thread summary for each of the plurality of message threads.

17. The non-transitory computer readable medium of claim 15, the code further comprising instructions executable by the processor to:

identify a set of rank orderings for the plurality of message threads; and generate a ranking value for each of the set of rank orderings, wherein the ordering is based on the ranking values.

* * * * *